Jan. 17, 1967    E. E. STEPHENSON    3,298,505
LAMINATED CLOSURE FOR FOOD TRAYS AND TRAYS CLOSED WITH SAME
Filed Feb. 12, 1965    2 Sheets-Sheet 1
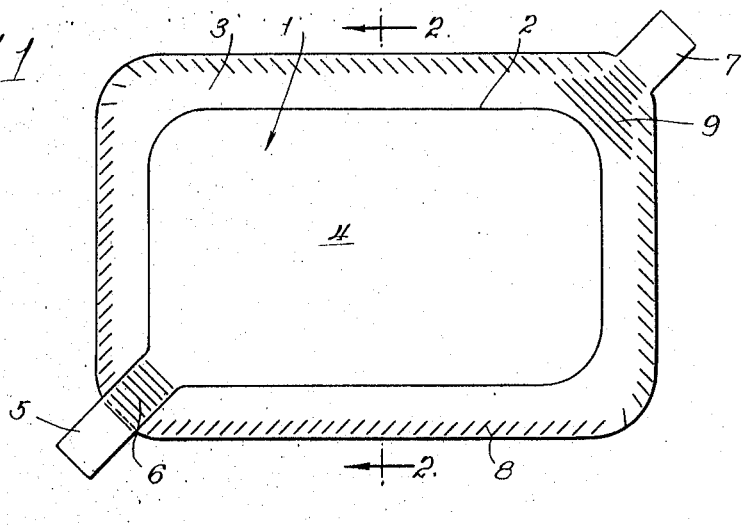
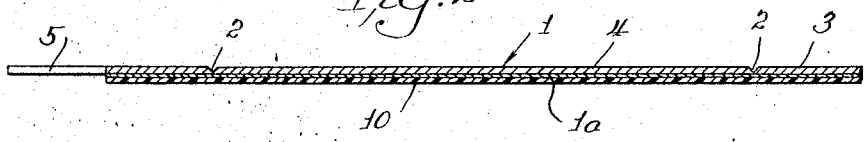
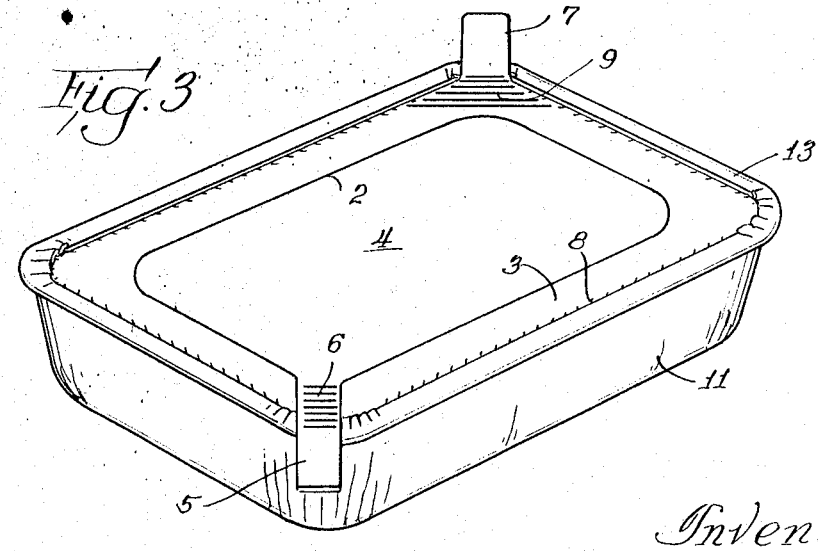
Inventor
Edward E. Stephenson
By
Atty.

Jan. 17, 1967     E. E. STEPHENSON     3,298,505
LAMINATED CLOSURE FOR FOOD TRAYS AND TRAYS CLOSED WITH SAME
Filed Feb. 12, 1965     2 Sheets-Sheet 2
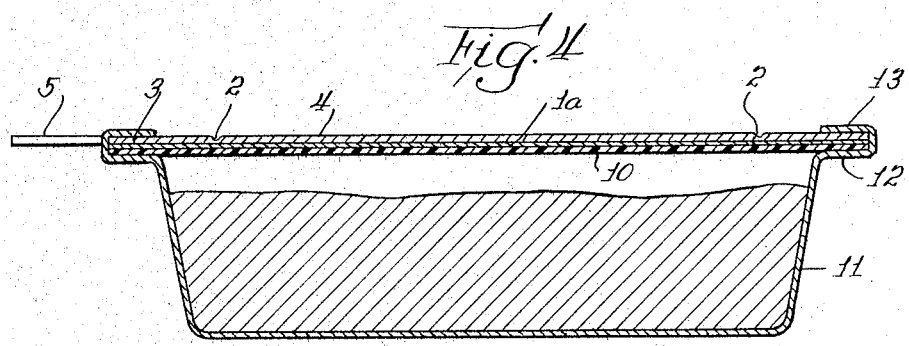
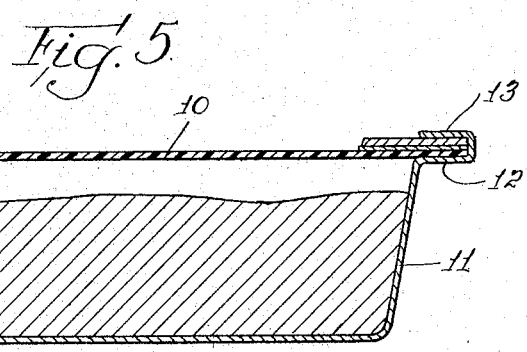
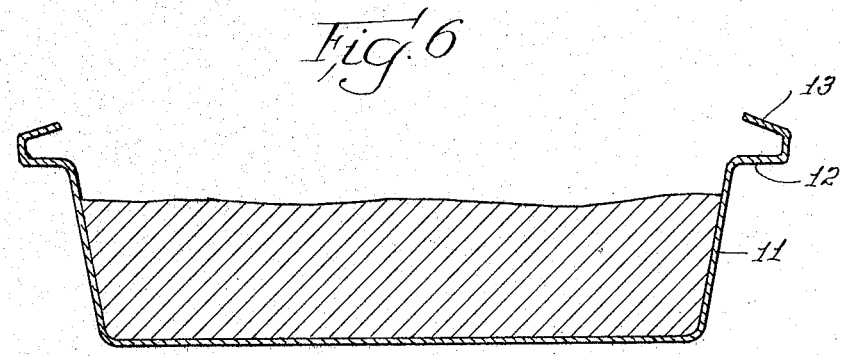
Inventor
Edward E. Stephenson

United States Patent Office 3,298,505
Patented Jan. 17, 1967

3,298,505
LAMINATED CLOSURE FOR FOOD TRAYS AND
TRAYS CLOSED WITH SAME
Edward E. Stephenson, Richland, Mich., assignor, by mesne assignments, to Brown Company, a corporation of Delaware
Filed Feb. 12, 1965, Ser. No. 432,221
16 Claims. (Cl. 206—45.31)

This invention relates to containers and is more particularly concerned with food containers and with an improved closure for such containers.

Containers are used for many purposes, including packaging and serving prepared foods, and particularly prepared foods which may be stored in cold or frozen condition and subsequently warmed in preparation for eating. Such containers generally comprise a container body, as for example a tray of a suitable material such as aluminum or other metal foil, and a closure for the top of the tray. In some applications it is highly desirable that, at a particular time or during a particular period, the contents within the container be made available to visual observation without completely opening the container. This enables containers having a variety of foods to be placed on a counter from which an individual consumer may then select the desired food or type of food based on his own visual observation. Although such visual observation is highly desirable, it is also desirable that the food be protected against the introduction of foreign matter or bacteria when the heated containers are placed on display. It has consequently been the previous practice to provide a transparent closure for the tray to achieve these desired ends. However, transparent films commonly used for this purpose do not by themselves provide adequate physical protection for the food during storage, transport, and subsequent heating.

It is accordingly an object of the invention to provide a closure for containers, and particularly food containers, which has excellent mechanical strength. It is a further object to provide a closure which can withstand the temperatures normally used for warming foods packaged in containers utilizing the closures of the invention. It is an additional object to provide such a closure having a window which may be protected until after the container and its contents have been heated, which window may then be exposed and left in place until serving, and the closure then readily removed to gain access to the container contents. The accomplishment of the foregoing and additional objects will become more fully apparent hereinafter.

According to the invention, a closure is provided for a container, the closure being formed as a laminated member comprising an opaque sheet-form ply of a material such as paperboard, a ply of a transparent film such as one formed of a synthetic resin, and a thermoplastic adhesive having a melting point substantially lower than that of said film affixing the film to the paperboard ply. The adhesive is also chosen so that its melting point is below or within the range of temperature commonly required for heating or reheating of packaged foods. As a result, when the container is heated, the heavier paperboard layer is delaminated from the transparent film and may be removed within an area defined by a line of weakness, exposing a transparent film window. The closure may then in turn be subsequently readily removed to gain access to the container contents.

The invention in its preferred embodiment is illustrated by the accompanying drawings in which:

FIG. 1 is a top plan view of a closure member according to the invention.

FIG. 2 is a cross-section of the closure member.

FIG. 3 is a perspective view of a covered and sealed food container.

FIG. 4 is a cross-section of the sealed container.

FIG. 5 is a cross-section of the sealed container with the outer ply removed from the closure, and FIG. 6 is a cross-section of the container with the entire closure member bearing the transparent film window removed.

Reference is now made to the accompanying drawings for a better understanding of the invention, wherein all of the parts are numbered and wherein the same numbers are used to refer to corresponding parts throughout.

Referring to FIG. 1, a closure designed according to the invention is shown comprising an opaque sheet-form member or ply 1 formed from a material such as paperboard. The sheet-form member 1 is provided with a peripheral line of weakness such as a score line 2 dividing the member into a peripheral frame 3 and a central panel 4. A tab 5 is provided at one corner connected to the central panel 4. Score lines 6 are provided to facilitate lifting the corner of the central panel 4, and tearing of the panel away from the frame 3. A tab 7 is provided at one corner of the sheet-form member 1 to facilitate its removal from the container flange. The border of the sheet-form member 1 is provided with diagonal slits 8, preferably diverging outwardly in the direction of pull, to facilitate its being pulled out from the crimped over flange of the container while grasping the tab 7. Scores 9 are also provided for this purpose.

As shown in FIG. 2, a transparent film 10 is provided on the reverse side of the closure adhesively secured to the paperboard layer 1 by means of a thermoplastic adhesive. As employed herein, the term "thermoplastic" is used in its broad sense, that is, denoting a material having the property of softening or fusing when heated, and hardening and becoming rigid again when cool. The term is not used in its special sense as sometimes applied to synthetic resins where it denotes permanently fusible materials, that is, materials which can be remelted and cooled time after time without undergoing any appreciable change, as distinguished from thermosetting or heat-reactable resins which undergo change upon heating. Whether the sealing material undergoes change or not during the heating and delaminating period is immaterial. So-called "heat-reactable" or thermosetting materials may be used if the adhesive can be melted and the paperboard layer delaminated and removed before the adhesive sets.

Any of a large number of thermoplastic adhesives may be used to laminate the transparent film to the sheet-form member, subject to several important requirements. First, the melting point of the adhesive must be substantially lower than that of the transparent film, so that the adhesive can be heated to a temperature at or above its melting point to delaminate the sheet-form layer from the transparent film without melting or in any way destroying the film. Another important consideration is that the melting point of the adhesive must be within the range of temperatures commonly used to heat foods of the type for which the container of the present invention is designed. Among the adhesives which may be used are waxes such as paraffin and microcrystalline waxes. Synthetic resins may also be used if they meet the stated requirements, among them being ethyl cellulose hot melts, vinyl resins, either plasticized or unplasticized, butyl—or other rubber-containing compositions, polyethylene-modified wax compositions, and the like.

Table 1 below lists a number of representative thermoplastic adhesives together with their melting points:

TABLE 1

| Thermoplastic Adhesives | Melting Point Range—° F. |
|---|---|
| Paraffin wax | 125–185 |
| Paraffin wax mixtures with microcrystalline wax and butyl rubber elastomer | 135–195 |
| Microcrystalline wax | 135–195 |
| Wax mixtures with addition of plasticizers, polymers, resins, metallic soaps and dyes | 125–195 |
| Low molecular weight polymers | 150–400 |
| Thermo plastic lacquers | 120–350 |
| Thermo plastic resins | 120–350 |
| Thermo plastic natural gums | 110–300 |

The adhesive should preferably be substantially colorless in order to avoid interference with visual observation if a portion of the adhesive should remain on the transparent film when the sheet-form member is removed.

In FIGS. 3 and 4 a covered and sealed container is illustrated, comprising a tray 11 having a flange 12 at its periphery. A crimped-over margin 13 of the flange 12 engages the periphery of the closure and provides a durable seal.

The container shown in FIGS. 3 and 4, when filled with the desired contents and sealed, is stored in the condition shown. When the contents are to be warmed, the entire unit is placed in such suitable warming means as an oven and heated to the desired temperature. The heat causes the paperboard layer 1 to be delaminated from the plastic film layer 10. Consequently, when the heated container is removed from the oven, the central paperboard panel 4 may be removed by grasping the tab 5 and tearing the panel along the peripheral score line 2. The transparent film layer 10 remains intact and permits placement of the container on a shelf, counter, steam table or the like, for viewing of the contents of the container and selection of a container having the desired contents from a group of similar containers displaying various types of foods, while at the same time protecting the contents from contamination, as shown in FIG. 5. When the contents are to be removed from the container, the tab 7 is grasped and the sheet-form member 1 bearing the transparent film 10 is readily removed from the peripheral crimped over flange, as shown in FIG. 6.

The container utilized with the closure of the invention is preferably but not necessarily in the form of a flanged tray having means provided for engaging and securing the closure. Any tray or similar container having such suitable engaging and securing means may be employed. It may be fabricated of any one of a variety of materials such as metal foil, paperboard, plastic, etc. Aluminum foil is one preferred material, plastic another.

The sheet-form member 1 of the closure may be fabricated of any suitable material having the necessary mechanical strength and rigidity to withstand the rigors of shipping and storing, and offering the required protection for the transparent film. Among suitable materials are paperboard, metal foil, plastic, etc. Paperboard is the preferred material.

The transparent film may be prepared from any of a number of suitable materials such as natural and synthetic resins, and cellulosic materials other than resins. The prime requisite of the material, in addition to transparency and suitable mechanical properties, is that it must be able to withstand the temperatures commonly utilized in ovens without fusion or destruction in any other manner. Where the containers are to be heated in common ovens, the film should be able to withstand temperatures of at least about 180° F. When the products are designed for warming in ovens operated at considerably lower temperatures, as for example electronic type ovens, materials may be used for the film which have somewhat lower melting points. The suitable materials for fabricating the transparent film may for convenience be divided into three classes, thermoplastic materials (those having a melting point), non-thermoplastic materials (those which do not have a melting point), and sheet materials which have no melting point and which are not inherently transparent, but which become transparent after they have soaked up the laminating adhesive. Among the suitable thermoplastic materials are Saran (polyvinylidene chloride), Mylar (polyethylene terephthalate), cellulose acetate, polypropylene, polyethylene, and ethyl cellulose. Among the non-thermoplastic film are those prepared from regenerated cellulose, glassine papers, amylose, and parchmentized papers. Among the materials which become transparent as a result of absorption of the laminated adhesive are unfilled kraft and sulphite papers. Mylar is the preferred material.

The composition of the film must be so chosen that it can withstand the temperatures used in warming the food and melting the thermoplastic adhesive by which it is adhered to its protective outer sheet-form cover layer. Moreover, when the closure is used for foods having a high moisture content, it is desirable that a material be chosen which is not water-sensitive.

Although a container body in the form of a relatively flat tray has been illustrated and described and is in fact preferred, it is to be understood that containers of various types, shapes and sizes may be utilized with the closure member of the invention.

The closure member is formed by laminating the plastic film such as Mylar to the sheet-form layer by means of the thermoplastic adhesive in conventional manner. The adhesive, as for example microcrystalline wax or a microcrystalline wax composition, may be applied first to one of the plies, as for example the paperboard, by any suitable means such as coating, rolling, or spraying. The other ply, as for example the transparent film, may then be laminated to the first ply by suitable means such as hot rolling.

The closure of the invention, as well as the combination of the closure and a complementary container, have a number of advantages over closures and containers commonly used in the art for food products. The paperboard cover provides protection against penetration and tearing of the transparent film by various objects during transportation, storage and heating, difficulties ordinarily encountered when a plastic film is used alone as a transparent closure for food containers. Moreover, the advantages of a transparent window to enable the contents of a sealed package to be observed are still retained, since the paperboard layer can be readily removed when the package has been heated. Moreover, the entire closure may be readily removed by grasping the tab provided therefor. Inasmuch as the structure of the closure lends itself extremely well to fabrication by mass production facilities, it may be produced at a relatively low cost. The completed package with contained food or the like is attractive and provides an excellent seal for the contents.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

I claim:

1. A laminated closure member adapted to close a container comprising a sheet-form member having a first tab extending beyond the periphery thereof, a transparent film, and a thermoplastic adhesive having a melting point substantially lower than that of said film securing said film to said sheet-form member, said sheet-form member having a line of weakness defining a removable panel having a second tab extending beyond the periphery thereof, whereby when said closure member is heated to a temperature sufficient to melt said adhesive, said second tab may be grasped and said panel removed to expose a window provided by said film and whereby said first tab may be grasped for removal of said closure member from the container which it is adapted to close.

2. A laminated closure member according to claim 1 wherein said sheet-form member is comprised of paperboard.

3. A laminated closure member according to claim 1 wherein said thermoplastic adhesive comprises wax.

4. A laminated closure member according to claim 1 wherein said transparent film is comprised of polyethylene terephthalate.

5. A laminated closure member according to claim 1 wherein said sheet-form member is provided with oblique slits at the periphery thereof.

6. A laminated closure member according to claim 1 wherein said tabs are positioned at diagonally opposed corners of said closure member.

7. A closed container with contained product comprising a container body, a laminated closure member having a tab extending beyond the periphery thereof, and means securing said closure member to said container body, said closure member comprising a sheet-form member comprising a sheet-form member, a transparent film, and a thermoplastic adhesive having a melting point substantially lower than that of said film securing said film to said sheet-form member, said sheet-form member having a line of weakness defining a removable panel provided with a tab extending beyond the periphery thereof, whereby when said closure member is heated to a temperature sufficient to melt said adhesive, said removable panel tab may be grasped and said panel removed to expose a window provided by said transparent film, and whereby, said container may be opened by grasping said closure member tab and removing said closure member.

8. A closed container according to claim 7 wherein said sheet-form member is comprised of paperboard.

9. A closed container according to claim 7 wherein said thermoplastic adhesive comprises wax.

10. A closed container according to claim 7 wherein said transparent film is comprised of polyethylene terephthalate.

11. A closed container according to claim 7 wherein said container body is comprised of metal foil.

12. A closed container according to claim 8 wherein the periphery of said closure member is provided with oblique slits to facilitate its removal from said container.

13. A closed container according to claim 8 wherein said first tab and said second tab are positioned at diagonally opposed corners of said closure member.

14. A closed container with contained product comprising a container body formed of metal foil, and a laminated closure member retained by a crimped-over flange of said container body, said closure member being provided with a tab extending beyond the periphery thereof and comprising a sheet-formed paperboard member, a transparent film, and a thermoplastic adhesive having a melting point substantially lower than that of said film securing said film to said sheet-form member, said sheet form member having a line of weakness defining a removable panel provided with a tab extending beyond the periphery thereof, whereby when said closure member is heated to a temperature sufficient to melt said adhesive, said removable panel tab may be grasped and said panel removed to expose a window provided by said transparent film, and whereby said container may be opened by grasping said closure member tab and removing said closure member.

15. A closed container according to claim 14 wherein the periphery of said closure member is provided with oblique slits to facilitate its removal from said container.

16. A closed container according to claim 14 wherein said first tab and said second tab are positioned at diagonally opposed corners of said closure member.

References Cited by the Examiner

UNITED STATES PATENTS

| | | | |
|---|---|---|---|
| 3,158,491 | 11/1964 | Farrell et al. | 229—51 |
| 3,233,819 | 2/1966 | Flaherty | 229—43 |

LOUIS G. MANCENE, *Primary Examiner.*

JAMES R. GARRETT, *Examiner.*